UNITED STATES PATENT OFFICE.

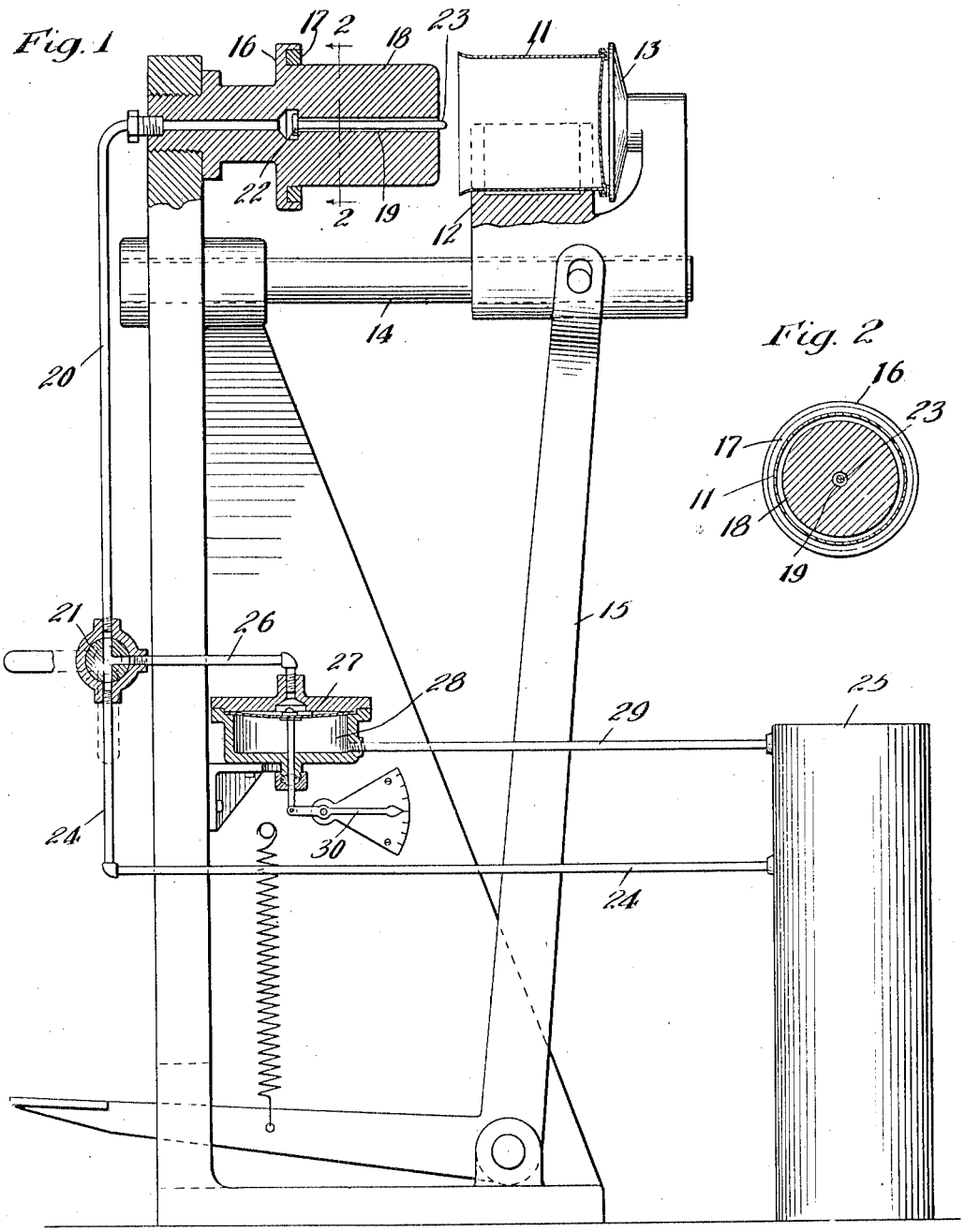

JAMES W. DIXON, OF CHICAGO, ILLINOIS, ASSIGNOR TO AMERICAN CAN COMPANY, OF NEW YORK, N. Y., A CORPORATION OF NEW JERSEY.

APPARATUS FOR TESTING CANS.

1,118,478. Specification of Letters Patent. Patented Nov. 24, 1914.

Application filed May 25, 1911. Serial No. 629,286.

*To all whom it may concern:*

Be it known that I, JAMES W. DIXON, a citizen of the United States, residing in Austin, Chicago, in the county of Cook and State of Illinois, have invented a new and useful Improvement in Apparatus for Testings Cans, of which the following is a specification.

This invention relates to a means for increasing the sensitiveness of apparatus for testing cans for leaks by means of compressed air, and the invention consists in partially filling the can to be tested with a bulk or mass to diminish the amount of compressed air contained in the can so that the ratio which the amount of air escaping by any leak in the can bears to the whole amount of compressed air contained in the can will be multiplied, and the difference between the air pressure in a leaky can and the air pressure in a sound can will be made thus more manifest.

In the accompanying drawings which form a part of this specification, Figure 1 is a side elevation, partly in section, of a hand operated air can tester. Fig. 2 is a section on the line 2—2 of Fig. 1.

In the drawing, 11 represents a can of the open mouthed variety to be tested.

12 is the can holder or cradle for supporting the tested can, and which is provided with a base plate 13 against which the can bottom rests. This cradle is shown to be mounted to slide on the rod 14 and to be moved on said rod by the foot lever 15 toward and away from the sealing head 16 provided with the rubber sealing cushion 17. Attached to the sealing head is the mass or bulk member 18, a cylindrical mass of approximately the dimensions and form of the interior of the can, and which, when the can is pushed against the sealing head nearly fills the interior of the can, leaving, however, on the sides and bottom a clearance space for containing the compressed air. The bulk 18 is preferably provided with an aperture 19 for the passage of the compressed air to the interior of the can, and this aperture is connected to the compressed air pipe 20 leading to the three-way valve 21. Within the bulk 18 is the automatic air valve 22 and valve stem 23 so contrived that when the can is compressed against the sealing head, the end of the valve rod comes in contact with the bottom of the can and opens the valve to admit the compressed air to the interior of the can; and when the can is withdrawn from the sealing head, the pressure of the air automatically closes said valve against the further passage of compressed air. Connected to the three-way valve 21 is the pipe 24 communicating with the compressed air supply tank 25; and communicating with the same three-way valve is the pipe 26 leading to one side of the diaphragm 27 contained in the chamber 28, the chamber on the other side of the said diaphragm being connected by the pipe 29 with the compressed air tank 25. Connected to the diaphragm and moving therewith is the indicator 30.

In operation, a can to be tested is placed in the machine upon the cradle 12 and its open mouth, by means of the foot lever, is brought over the bulk 18 and in contact with the sealing head, thereby sealing the interior of the can from outside air. By this movement, the stem of the valve, striking against the bottom of the can, opens the valve and admits to the interior of the can compressed air from the tank 25 through the pipe 24, valve 21 and pipe 20. Thereupon, the valve 21 is rotated so that the pipe 20 is put into communication with the pipe 26, to thus bring the pressure of the air contained within the can to bear upon the upper side of the diaphragm, while at the same time the air from the tank bears upon the lower side of the diaphragm. So long as no air leaks out of the can these pressures should, of course, balance, and no movement will be indicated on the indicator. But after the lapse of a sufficient time to permit the air to escape, if there be a leak in the can, this balance will be destroyed and the superior pressure of the tank will thereupon move the diaphragm and give an indication on the indicator disclosing the fact that the can leaks.

The object of partially filling the interior of the can with the displacing bulk is to diminish the space for containing the compressed air, thus making the action of the tester more sensitive. The compressed air is very elastic and the leaks are apt to be very minute, and where a great bulk of air is in question, a minute leak will not be so readily detected as where a small bulk of air is in question. Thus, for example, if the chamber or can to be tested contains ten gallons of air, it would take ten times as long for a leak to empty it, as it would if the can contained but one gallon of air, and in such case the leak would empty the small amount of air while it would only reduce the pressure in the can containing the large amount of air by one tenth. It will thus be seen that the introduction of the displacing bulk in the can by diminishing the room for compressed air, and the consequent volume thereof, increases the sensitiveness of the testing apparatus and also diminishes the length of time required for the test.

I claim:—

1. In a can tester of the character described, a base having a flat surface against which the open end of a can is adapted to be seated and sealed, an air-displacing body secured to said base and so positioned that when the can is seated on the base the body will be located entirely within the can, but free from engagement therewith, and means for admitting air to the interior of the can so seated, the air entering the space between the can and said body, substantially as described.

2. In a can tester of the character described, a base having a surface against which the open end of a can is adapted to be seated and sealed, an air-displacing body mounted on said base and so positioned that when the can is seated on the base the body will be located entirely within the can but free from engagement therewith, a clamping member coöperable with the base to clamp the can therebetween, and means for admitting air to the interior of the can when seated and sealed on the base, the air occupying the space between the can and said air-displacing body, substantially as specified.

3. In a can tester of the character described, a base having a flat surface against which the open end of a can is adapted to be seated and sealed, an air-displacing body secured to said base and so positioned that when the can is seated on the base the body will be located entirely within the can but free from engagement therewith, means for admitting air under pressure to the interior of the can so seated, the air entering the space between the can and said body, an indicator, and connections from the indicator leading to the interior of the can when seated whereby the indicator indicates changes of pressure within the sealed can, substantially as specified.

4. In a can tester of the character described, means on which the open end of a can is adapted to be seated and sealed, an air-displacing body associated with said means and so positioned that when the can is seated and sealed, the body will be located entirely within the can but free from engagement therewith, means for admitting air to the interior of the can when so seated and sealed, the air entering the space between the can and said body, and means for indicating a change in the air pressure in the sealed can after a supply of air thereto has been shut off, substantially as specified.

5. In a can tester, in combination: a sealing base and a movable member adapted to clamp a can against the base and seal the can, a compressed air supply, connections from the supply adapted to conduct the compressed air to the interior of the sealed can and having a valve included therein which is normally closed but is adapted to be opened when the can is in sealed position, an air chamber having a movable diaphragm therein, connections from the air supply to the chamber on one side of the diaphragm, and connections from the chamber on the other side of the diaphragm and communicating with the connections from the supply to the interior of the sealed can, an indicating dial and finger, a connecting member between the finger and the diaphragm, and means for shutting off the supply of compressed air to the interior of the can and forming a path for the compressed air from the can to one side of the diaphragm in the chamber.

JAMES W. DIXON.

Witnesses:
 PEARL ABRAMS,
 ESTHER ABRAMS.